United States Patent
Nyman et al.

(10) Patent No.: US 8,333,653 B2
(45) Date of Patent: Dec. 18, 2012

(54) SYSTEM, DEVICE AND METHOD FOR PAPERLESS WAGERING AND PAYMENT OF WINNINGS

(75) Inventors: Timothy B. Nyman, Bristol, RI (US); Richard G. Finocchio, Everett, MA (US); Richard S. Meehan, South Kingstown, RI (US); Thomas K. Oram, Hudson, MA (US)

(73) Assignee: GTECH Corporation, Providence, RI (US)

( * ) Notice: Subject to any disclaimer, the term of this patent is extended or adjusted under 35 U.S.C. 154(b) by 469 days.

(21) Appl. No.: 12/578,320

(22) Filed: Oct. 13, 2009

(65) Prior Publication Data

US 2010/0093421 A1    Apr. 15, 2010

Related U.S. Application Data

(60) Provisional application No. 61/104,828, filed on Oct. 13, 2008, provisional application No. 61/122,179, filed on Dec. 12, 2008, provisional application No. 61/207,866, filed on Dec. 29, 2008.

(51) Int. Cl.
*A63F 13/00* (2006.01)

(52) U.S. Cl. .............................. 463/25; 463/17; 463/29

(58) Field of Classification Search ................... 463/16, 463/17, 20, 25, 29, 42
See application file for complete search history.

(56) References Cited

U.S. PATENT DOCUMENTS

| | | |
|---|---|---|
| 5,038,022 A | 8/1991 | Lucero |
| 5,265,874 A | 11/1993 | Dickinson et al. |
| 5,290,033 A | 3/1994 | Bittner et al. |
| 5,317,135 A | 5/1994 | Finocchio |

(Continued)

FOREIGN PATENT DOCUMENTS

EP    1136956    9/2001

(Continued)

OTHER PUBLICATIONS

Pacificnet, Inc., "PacificNet's China Subsidiary Launches Legal Welfare Lottery E-commerce Site www.lot888.com with Integrated Payment via China UnionPay," Press Release, Dec. 11, 2007, www.prnewswire.com/cgi-bin/stories.pl?ACCT=104&STORY=/www/story/12-11-2007/0004720936&EDATE>.

(Continued)

*Primary Examiner* — James S McClellan
(74) *Attorney, Agent, or Firm* — Williams Mullen PC; Thomas F. Bergert

(57) ABSTRACT

A transaction card facilitates typical consumer transactions as well as transactions related to lottery offerings and can incorporate a reader terminal to associate lottery tickets with the transaction instrument. New gaming opportunities tied to the instrument are also facilitated, including a personalized guaranteed prize structure, a personalized and/or localized jackpot and an opportunity for winning additional prizes when making purchases using the instrument. The system according to one embodiment of the present invention provides at least a lottery data processing system for communicating a first funding amount to be applied to a multi-purpose transaction card based on winnings from a lottery offering, and a reader terminal for reading at least a portion of the transaction card, reading indicia on one or more gaming tickets, and associating the one or more gaming tickets with the transaction card. In one embodiment of the present invention, a custodian not associated with the winner or cardholder can derive non-transaction related earnings on the winnings without providing a fee to the cardholder.

33 Claims, 7 Drawing Sheets

U.S. PATENT DOCUMENTS

| | | | |
|---|---|---|---|
| 5,429,361 | A | 7/1995 | Raven et al. |
| 5,451,756 | A | 9/1995 | Holzer et al. |
| 5,457,306 | A | 10/1995 | Lucero |
| 5,470,079 | A | 11/1995 | LeStrange et al. |
| 5,559,312 | A | 9/1996 | Lucero |
| 5,811,772 | A | 9/1998 | Lucero |
| 5,902,983 | A | 5/1999 | Crevelt et al. |
| 5,952,640 | A | 9/1999 | Lucero |
| 5,959,277 | A | 9/1999 | Lucero |
| 6,019,283 | A | 2/2000 | Lucero |
| 6,032,859 | A | 3/2000 | Muehlberger et al. |
| 6,048,269 | A | 4/2000 | Burns et al. |
| 6,142,369 | A | 11/2000 | Jonstromer |
| 6,247,643 | B1 | 6/2001 | Lucero |
| 6,347,738 | B1 | 2/2002 | Crevelt et al. |
| 6,505,772 | B1 | 1/2003 | Mollett et al. |
| 6,547,131 | B1 | 4/2003 | Foodman et al. |
| 6,601,771 | B2 | 8/2003 | Charrin |
| 6,729,957 | B2 | 5/2004 | Burns et al. |
| 6,729,958 | B2 | 5/2004 | Burns et al. |
| 6,736,725 | B2 | 5/2004 | Burns et al. |
| 6,869,362 | B2 | 3/2005 | Walker et al. |
| 6,945,457 | B1 | 9/2005 | Barcelou |
| 7,062,470 | B2 | 6/2006 | Prasad et al. |
| 7,080,782 | B2 | 7/2006 | Charrin |
| 7,201,654 | B1 | 4/2007 | Jarvis et al. |
| 7,229,353 | B2 | 6/2007 | Seelig |
| 7,275,991 | B2 | 10/2007 | Burns et al. |
| 2001/0016514 | A1 | 8/2001 | Walker et al. |
| 2003/0032474 | A1 | 2/2003 | Kaminkow |
| 2003/0036425 | A1* | 2/2003 | Kaminkow et al. ............. 463/25 |
| 2003/0125108 | A1 | 7/2003 | Groz |
| 2004/0259631 | A1* | 12/2004 | Katz et al. ....................... 463/25 |
| 2005/0070358 | A1 | 3/2005 | Angell et al. |
| 2005/0085293 | A1 | 4/2005 | Lindo |
| 2005/0107152 | A1 | 5/2005 | McGee et al. |
| 2005/0130735 | A1 | 6/2005 | Ellis |
| 2005/0181875 | A1 | 8/2005 | Hoehne et al. |
| 2005/0187012 | A1 | 8/2005 | Walker et al. |
| 2005/0187020 | A1 | 8/2005 | Amaitis et al. |
| 2005/0209003 | A1 | 9/2005 | Adams |
| 2006/0052153 | A1 | 3/2006 | Vlazny et al. |
| 2006/0052159 | A1 | 3/2006 | Cahill |
| 2006/0154720 | A1 | 7/2006 | Okuniewicz |
| 2006/0242046 | A1 | 10/2006 | Haggerty et al. |
| 2007/0066386 | A1 | 3/2007 | Shields |
| 2007/0093298 | A1 | 4/2007 | Brunet |
| 2007/0226002 | A1 | 9/2007 | Tyra et al. |
| 2007/0278294 | A1 | 12/2007 | Page |
| 2008/0113776 | A1 | 5/2008 | Sommer |
| 2008/0146337 | A1 | 6/2008 | Halonen et al. |
| 2008/0153583 | A1 | 6/2008 | Huntley et al. |
| 2008/0214261 | A1 | 9/2008 | Alderucci |
| 2008/0215500 | A1* | 9/2008 | De La Motte ............... 705/36 R |
| 2008/0228556 | A1 | 9/2008 | Megdal et al. |
| 2008/0255987 | A1 | 10/2008 | Otsu |
| 2008/0287187 | A1 | 11/2008 | Seelig |

FOREIGN PATENT DOCUMENTS

| | | |
|---|---|---|
| EP | 0589545 | 11/2003 |
| WO | WO 0058858 | 10/2000 |
| WO | WO 0141892 | 6/2001 |
| WO | WO 2007/046963 | 4/2007 |
| WO | WO 2007/100744 | 9/2007 |

OTHER PUBLICATIONS

3line Card Management Limited, "In the Media: Transforming Card Business in Nigeria," May 8, 2008, www.3lineng.com.

* cited by examiner

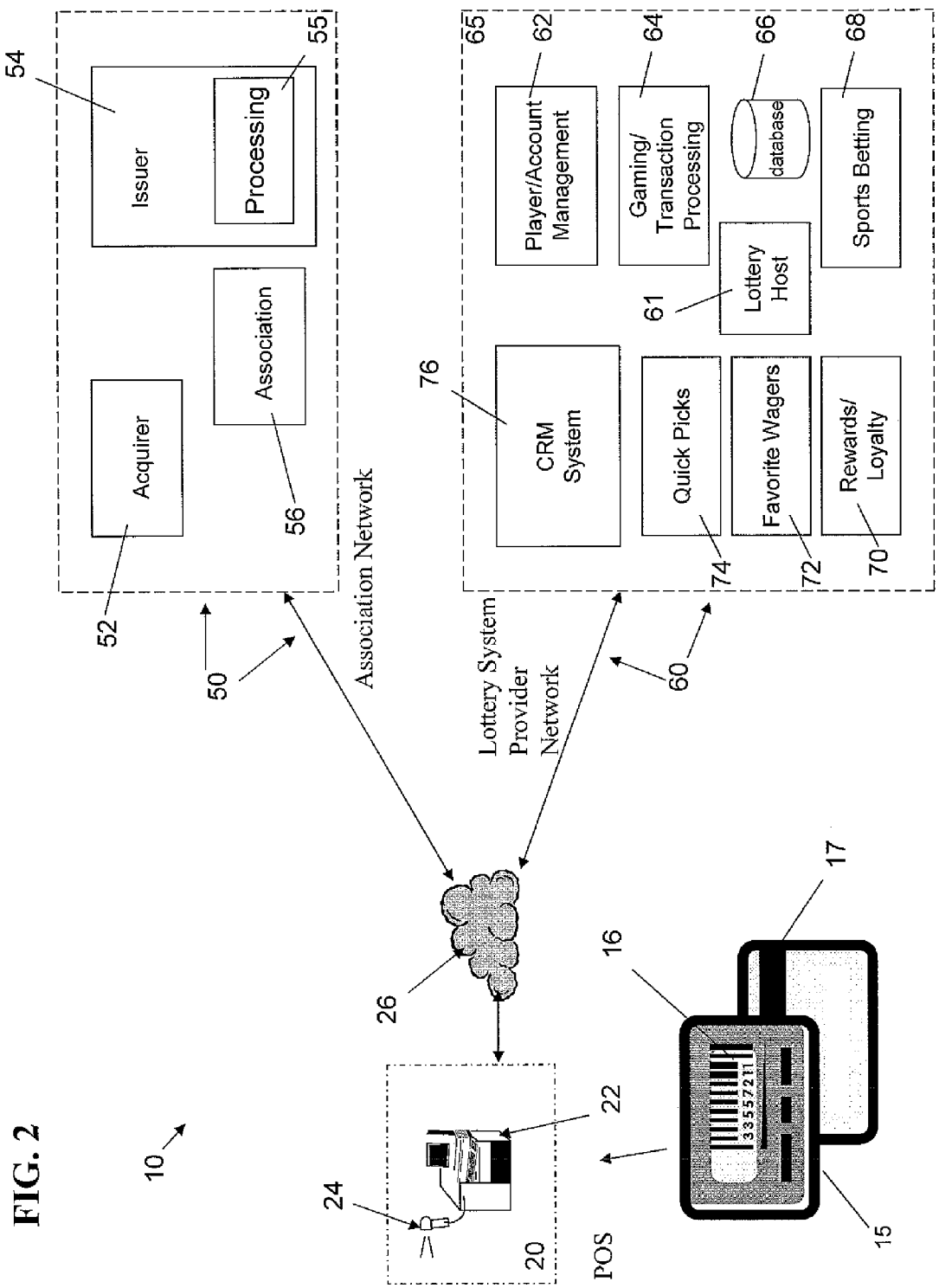

SYSTEM, DEVICE AND METHOD FOR PAPERLESS WAGERING AND PAYMENT OF WINNINGS

CROSS-REFERENCE TO RELATED APPLICATIONS

The present application claims the benefits of U.S. Provisional Application Ser. No. 61/104,828, filed Oct. 13, 2008, entitled "System and Method for Paperless Wagering and Payment of Winnings," U.S. Provisional Application Ser. No. 61/122,179, filed Dec. 12, 2008, entitled "System, Device and Method for Paperless Wagering and Payment of Winnings," and U.S. Provisional Application Ser. No. 61/207,866, filed Dec. 29, 2008, entitled "System, Device and Method for Paperless Wagering and Payment of Winnings," all of which are incorporated herein by reference.

BACKGROUND OF THE INVENTION

Past and modern lottery and gaming systems are beset with problems. A typical lottery purchase and redemption transaction is illustrated in FIG. 1. As shown at 11, a lottery ticket is purchased at a point-of-sale or kiosk station of a participating retailer. Playslips may be involved for those players selecting numbers for a lottery drawing. As shown at 12, the ticket is played. If the ticket is an instant ticket, it is played by scratching the surface or other means to determine if it is a winner. If the ticket is for a lottery drawing, the player awaits the results of the drawing to determine if the ticket is a winner. As shown at 13, players with a winning ticket can redeem the ticket at participating retailers, or for higher prizes, the winning ticket is redeemed at a lottery claim center. In the United States, federal law delineates between a high tier winner ($600 and above) and a low tier winner ($599 and below). By processing the high tier winners at the claim centers, taxes can be appropriately withheld pursuant to legal requirements.

Gaming with physical tickets exposes lottery operators and system providers to losses due to theft of tickets and fraud. Physical tickets also require dispensers and/or kiosks within retail environments, which can overburden retailers in their efforts to free up space for saleable merchandise. Kiosks and other physical devices are also expensive and contribute to high infrastructure costs for retailers and lottery and/or gaming service providers who must buy, install and manage these devices. In addition, lottery service providers must build, maintain and upgrade proprietary networks in order to service their customers.

The processing of lottery purchases and winnings is also an arcane function. When playslips and/or cash are used in the purchase of lottery offerings, the participating retailer must generally provide a manned POS terminal. If a given ticket is a winner and associated with a "low tier" jackpot, the participating retailer must be prepared to make payment to the player presenting the ticket for redemption, even if the ticket was not purchased at the retailer's location. While the redeeming retailer is reimbursed by the lottery operator (e.g., the state running the lottery), and further while the redeeming retailer can net its lottery proceeds against payouts during a given week or other time period, it is possible that the retailer can be temporarily out-of-pocket for the difference between paid winnings and lottery sales. Further, the retailer must staff the POS to handle the redemption transactions. For high tier winnings, a player must fill out paperwork at a lottery claim center, where the lottery operator performs various background checks to confirm the winner, taxes and other withholdings are optionally deducted, and the winner is then issued a check. Such steps are inconvenient to the winner, and add to the cost and oversight requirements of lottery operators.

In addition to the above, lottery and gaming systems generally involve anonymous players. Not only does this facilitate undesirable behaviors (e.g., addiction, tax evasion), but it does not allow the lottery operator or retailer to know anything meaningful about their market. If demographic and other information could be collected about their players, lotteries and retail distributors could more efficiently and profitably manage their operations.

BRIEF SUMMARY OF THE PRESENT INVENTION

The present invention provides a solution to the above problems and more. In one aspect, the present invention provides a claims management system and process whereby a lottery system provider (LSP) such as GTECH Corporation, for example, can interact with a lottery operator (LO), such as a state lottery, and use funds that are pre-paid by the LO and held in an LSP account to pay winnings to a lottery player. In one embodiment, winnings can be paid via a debit or other transaction card, which can be a MasterCard™ or Visa™-branded debit card or a privately labeled debit card. The winning funds are transferred by the LO to the LSP at the time of the winner selection process. The LSP pays out the winning amount upon presentment, reconciliation and settlement, and the funds are made accessible to the player on the transaction card. In one embodiment, interest on the funds begins to accumulate when the winner selection is made and the monies are transferred from the LO to the LSP. The interest can be divided among entities pursuant to given requirements for the jurisdiction or as the situation dictates. A player is free to use the winnings that are credited onto his or her debit card anywhere, including for purchases of standard consumer (e.g., non-lottery) products and offerings as well as for purchases of lottery offerings. For purposes of the present disclosure, the term "lottery offering" means a government-sponsored lottery or public gaming offering, including traditional lottery games such as instant lottery tickets and online or draw-type lottery tickets, video lottery games and other casino-type games that may be government sponsored, games of chance and games of skill, for example. Also, a lottery transaction means a transaction related to a lottery offering, a lottery player means a player of a lottery offering, and a lottery wager means a wager in connection with a lottery offering.

The present invention thus provides the lottery player with the convenience of a card, such as a debit card, that can provide a variety of benefits. For example, the user card can be automatically entered into a Visa™ or other branded card affinity program, lottery wagers can be automatically deducted from the account and the card can be used anywhere a credit or debit card is accepted. Further, the player can be entered into a "Player Club" and use the card as a player card for benefits such as, for example, having an account accessible via web site for setting up favorite numbers, developing a syndicate account or accounts, entering into second chance drawings, associating purchased tickets with the account, arranging for automatic payments (i.e., never having to check a hard copy ticket to know if the player is a winner), receiving automatic alerts via e-mail, receiving an IRS 1099 form identifying all non-winners for tax deduction, experiencing express transactions at retail, and experiencing new game content such as fantasy football and other fantasy sports. Even further, the present invention can facilitate self-monitoring and independent monitoring of individual behavior to promote responsible gaming.

In another aspect, the present invention provides a transaction instrument (TI) such as a multi-purpose transaction card (MPTC), bearing two or more indicia that facilitate standard consumer transactions as well as lottery transactions. For example, in one embodiment of the invention, the MPTC can be provided with: (1) a magnetic stripe for "open network" transactions, such as purchasing groceries, electronics or other consumer items, and (2) a barcode for being scanned by a retailer in connection with a lottery offering for "closed network" transactions, wherein the barcode can be representative of the user's pre-established account, favorite wager, quick picks, specific numbers, wagering amounts, discounts, benefits, promotions and so forth. When the MPTC has value associated with it, it is a value-applied transaction instrument (VATI).

In another aspect of the present invention, the MPTC can be issued at different times to different players. For example, the MPTC can be issued for high-tier (or low-tier, or both) winners at the time the winner seeks to redeem a winning play, in which case the MPTC can be formally registered with the individual winner by obtaining and recording player information at the time of redemption. Player information can include name, address, telephone number, e-mail address and other contact information, in addition to other relevant information required for legal or future transactional purposes. The player information can be obtained from a valid driver's license, for example. Further, the player information can be stored and accessible via the Internet or other network to allow the player to access, update and/or change the player information. The player can select or be provided with a username and password or other known authentication means for preventing unauthorized access to the player's account information. The player can optionally remain anonymous but still record player-related information such as favorite wagers by having the account associated with the MPTC or other identifier that does not reveal the player's identity.

Separately, the MPTC can be issued to the player at a point of purchase (POP), whether the player is participating in a lottery offering or not. The player may then use information on the MPTC, such as a code or identification information, to formally register the MPTC in the player's name or with player specific information online after leaving the POP. The player may fund the MPTC online or in person at the POP, and may subsequently use the MPTC for general or lottery transactions, as well as to add credit to the account through cash or credit deposits, or through winnings from lottery offerings.

The form factor of the MPTC can preferably be similar to that of a standard credit, debit or stored value card, and can operate similarly thereto. The cards can implement contact technology such as magnetic stripes, and/or contact-less technology such as scannable barcodes, radio frequency identification (RFID) tags or Bluetooth™, for example. In one embodiment of the present invention, mobile communications devices can be employed as the TI or VATI instead of cards, whereby barcodes may be displayed on the visual display of the devices and a communication implementing object other than a magnetic stripe is incorporated for commercial transactions. In a further aspect of the present invention, the TI or VATI can be the player themselves or a part of the player, wherein the player's personal biological information (e.g., fingerprint, retina scan, voice or other human biologically unique information) can be recorded and stored with his or her account as part of his or her player information, and then compared with the biometric information measured when the user desires to initiate a transaction using the system of the present invention.

In another aspect of the present invention, rewards and customer relationship management (CRM) features can be incorporated. Thus, whereas the player has traditionally been anonymous, the present invention facilitates knowing what the purchasing and gaming habits are of the card holder, and can allow the card holder to earn rewards and build credits towards desirable products and services, for example. In one embodiment of the present invention, the player can remain anonymous while still earning monetary prizes and/or non-monetary rewards.

In providing the above, the present invention facilitates the operation of a gaming system without kiosks or point of sale terminals necessarily adapted for lottery transactions. Point-of-sale terminals are still employed in one implementation of the present invention, but such terminals can be ordinary retail terminals provided with reader technology to facilitate reading and writing of information to the transaction instrument. Costs of operation for the LSP are lowered, which in turn reduces costs for lottery operators and retailers. Profits are improved as well, with the ability to earn interest from winnings managed in a LSP account as well as the ability to generate revenue through better knowledge of the lottery customer. In this regard, the present invention provides a method for a lottery system operator to derive non-transaction related earnings without providing a fee to the cardholder.

In addition to the above, lotteries and players can employ new lottery offerings using the transaction instrument (e.g., a lottery-branded card). The present invention provides additional aspects related to new gaming opportunities, including a personalized guaranteed prize structure, a personalized and/or localized jackpot and an opportunity for winning additional prizes when making purchases using the card. Further, the present invention improves tracking of wagering customer sessions. Even further, the present invention facilitates player convenience and security through the employment of biometric measures as described below.

BRIEF DESCRIPTION OF THE DRAWINGS

FIG. 2 is a schematic diagram illustrating one embodiment of a system of the present invention incorporating a lottery system backend and a traditional commercial transaction system backend.

DETAILED DESCRIPTION OF INVENTIVE ASPECTS OF THE PRESENT INVENTION

Figure 1:
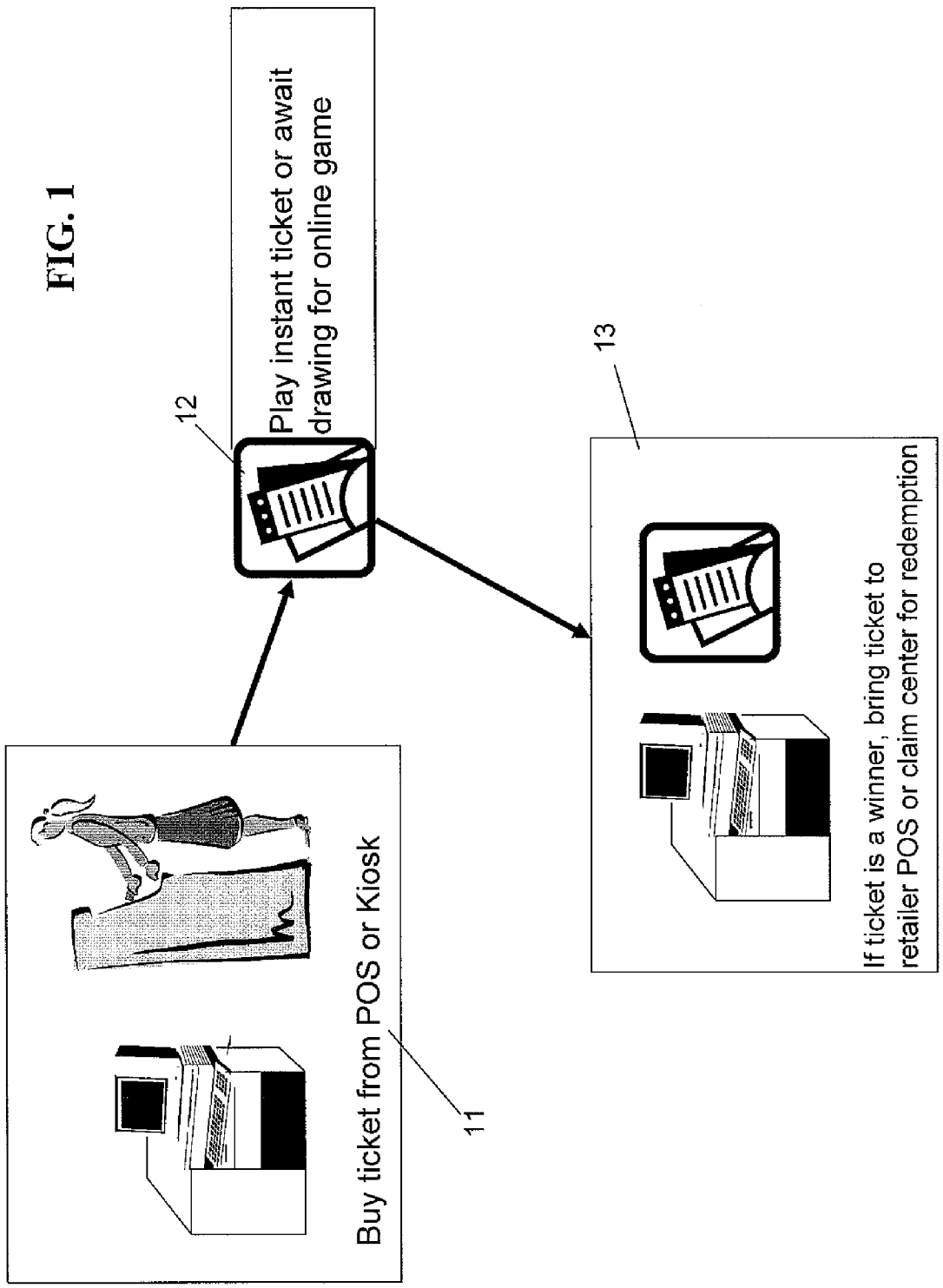
FIG. 1 is a flow diagram illustrating traditional lottery ticket purchase and redemption.

As used in the present application, the term "transaction instrument" can include or be associated with, by way of example and without limitation, a debit card, a credit card, a smart card, a gift card, a pre-paid card, a stored value card, a bank card, a "frequent-player" card, indicia such as a bar code or a magnetic stripe, a human biological identifier, a voucher, a radio frequency identification (RFID) tag or transmitter, an ATM card, a combination card, any other coded indicia, Bluetooth™-enhanced devices, mobile communications devices adapted for use with the above, or combinations of any of the above. The transaction instrument is or can represent a personal identifier specific to an individual person, as exemplified above. The transaction instrument can be associated with a unique identifier such as a credit or debit card number, serial number, IP address, or e-mail address, for example.

The transaction instrument can be credited through an account associated with the transaction instrument, such as by paying cash, transferring funds from another account, and/or transferring winnings from lottery offerings into the account. The account associated with the transaction instrument can be, for example, a debit or credit card account, a bank account, a savings account, a lottery account, a checking account, and/or another financial account. The account can be a financial institution account (e.g., Bank of America™ checking, savings or brokerage account) or a financial account maintained independently of a financial institution.

In one embodiment of the present invention, the transaction instrument (TI) takes the faun of a multi-purpose transaction card (MPTC) as referenced above. An example such card is shown at 15 in FIG. 2, with a machine readable barcode 16 on one side of the card and a machine readable magnetic stripe 17 on the other side. It will be appreciated that these and other indicia may appear on the same side of the card in an alternative embodiment of the present invention. In one embodiment of the present invention, the MPTC includes indicia in the form of a visible computer chip on one face of the card, which is employed when the MPTC operates as a "smart card" capable of being read and written to by a reader or terminal in accordance with the present invention. The smart card implementation can employ either a local card memory or a complete local central processing unit (CPU) for added data storage and processing capability.

As further shown in FIG. 2, paperless wagering is facilitated in the system 10 of the present invention, which can operate without dedicated kiosks or lottery adapted POS terminals. POS terminal 20 is a traditional POS terminal with transaction capabilities, employing a terminal processor 22 and a reader in the form of a bar code scanner 24. The POS terminal is connected via one or more networks 26 to an association network 50 (such as MasterCard™/VISA™ network) and a lottery service provider network 52. In one embodiment of the present invention, communications intended for the association network 50 from the terminal 20 travel over network 50 to lottery host 61 within lottery service provider network 52 before being sent to the association network.

The association network 50 manages transactions unrelated to lottery offerings in the customary way through communications between the card issuing bank 52, the transaction acquiring bank 54 and the association 56 (e.g., MasterCard™/VISA™). The card issuing bank can include a bank or financial institution data processing system 55 for managing account transactions. The financial institution data processing system includes programming for, among other things, initiating the opening of a financial institution account. In one embodiment of the present invention, an account can be opened and funded with a balance in the amount of winnings from a lottery offering.

Lottery service provider network 60 connects to a lottery data processing system 65, which can incorporate lottery host 61, and can further coordinate and/or run various lottery service provider functions such as player and account management component 62, gaming/transaction processing component 64, database 66, customer relationship management (CRM) component 76, favorite wagers component 72, quick picks component 74, loyalty rewards component 70 and sports betting component 68. Lottery host 61 can include, for example, programming for validating winning tickets, generating ticket data, randomizing winners, benefits and prizes, managing lottery offerings and communications. The lottery data processing system 65 can communicate with the financial institution data processing system. In one embodiment, the lottery data processing system 65 communicates the winnings from a lottery offering to the financial institution data processing system in order to fund a newly created financial institution account, as described in more detail hereinafter.

In one aspect, the system of the present invention encompasses the full cycle of transaction card life, from creation and activation of the card as a multi-purpose transaction card, to conversion of the card into a value card (e.g., VATI discussed elsewhere herein) representing winnings from a lottery offering, to enrollment of the card with player, account, transaction and customer relationship management features, to redemption and application of prizes, winnings and other transaction amounts, to end of card life. Further, it will be appreciated that, while it is actually a human player or user who is technically enrolled with the system of the present invention, the player or user is represented in the system by one or more personal identifiers. The personal identifiers can be informational or biometric, as described elsewhere herein.

Regarding system architecture, the system of the present invention can optionally be established so as to operate using a client-server architecture, a distributed architecture, or a combination of the two. By way of example, for lottery system transactions, in the client-server architecture, using FIG. 2 as an example, the terminal 20 receives information about a transaction such as by scanning or reading a card, and then queries the lottery system host 61 regarding the value, game or reward involved. The data surrounding the transaction is centrally located with the lottery system in database 66, and the effect of reading the card is to essentially point to the lottery system maintained data, such that there is no transaction performed on the card and no value is stored on the card. Every time the card is used, the lottery host 61 queries the lottery system database 66 to determine if prizes, rewards or other benefits must be accommodated. In one embodiment of the present invention, benefits can be in terms of cash (i.e., "prizes" such as $20 credit) or can be in terms of non-cash items (i.e., "rewards" such as coupons, services, physical products, etc.). For example, upon the reading of a card at the terminal 20, the host queries the data for the player associated with the card, and if the player is entitled to a random benefit as a result of using the card, the host instructs the system to issue the benefit in the player's favor. In this example, if the benefit is a ten percent discount reward for a hotel, the player may receive a message (such as an e-mail to a registered e-mail account associated with the player's account) indicating what the player has won. Further, the discount information can be electronically associated with the player account (by adding an entry in the data maintained for the player, for example) such that the user need not maintain paper coupons or other hard copy representations of the reward. In the case of a cash prize, the amount can be credited to the player's financial account for later use.

In an alternative embodiment, the present invention operates using a distributed system architecture. In this embodiment, the POS terminal 20 and the MPTC transact value at the point of transaction without referring back to the lottery host. The information and the value representation are transferred and processed in real-time or near real-time as the transaction is occurring. The terminal (or group of terminals, such as in the embodiment where a single retailer has multiple terminals) can have a distributed host (i.e., not the centrally located lottery host 61) which can act to issue rewards, prizes and other benefits locally. Smart cards and contact-less cards can be employed in this embodiment, which may increase the cost of deployment, but can also provide greater flexibility in system operation and the ability to meet more individual customer needs.

The present invention may further offer a combination client-server/distributed system architecture. In this hybrid architecture, the terminal and the MPTC can transact the value at the point of transaction as in the distributed system, but the data collected by the terminal is regularly sent to the lottery host 61 (e.g., in batches) to reconcile the card and central database information with the locally collected information. Such an embodiment may be preferred by retailers with multiple locations, for example, and can deploy smart cards as the preferred MPTC card type.

It will be appreciated that the POS terminal can be a network-connected personal computer in one embodiment of the present invention, wherein the computer can be located in a retail establishment or even on the user's person (e.g., a mobile communications device) or in the user's own home. Since electronic commerce permits nearly ubiquitous transactions, any electronic communications device that can access the network of the present invention can be considered a POS terminal for purposes of the present disclosure. In one embodiment, the terminal is a reader terminal (i.e., a self-contained processing device or terminal that is adapted with a reader unit), wherein the reader is capable of reading and/or writing to magnetic stripes, chips and/or barcodes but not capable of reading biological identifiers (i.e., biometric signatures). In another embodiment, the terminal is a reader terminal that can read and/or write to magnetic stripes, chips and/or barcodes as well as biological identifiers. In a further embodiment, the terminal is a reader terminal that has no magnetic stripe, chip or barcode reading or writing capability but can read biometric information in order to personally identify a user of the present invention.

Readers that can be employed with the terminals of the present invention can include, for example, a magnetic stripe reader, a barcode scanner, a magnetic stripe or other smart card writer for writing information to a card, a fingerprint reader, a retinal eye scanner or the other reader types discussed elsewhere herein. The reader can be employed with an attended POS terminal in a retail store or other commercial location, a self-contained kiosk in a retail store or other commercial location, or the mobile equivalent of the self-contained kiosk (e.g., a home personal computer or user mobile communication device). The reader can be interfaced with the terminal by any of a variety of known computer interfaces, including USB port, PCMCIA slot, parallel port, floppy disk slot, infrared IRDA port, RS232 serial port or keyboard, for example.

The present invention can accommodate specific card-type protocols according to the card-type employed. Thus, for example, the present invention employs barcode and magnetic stripe communication protocols to enable the implementation of a system that can handle MPTCs with barcode and magnetic stripe indicia thereon. Smart card and contactless smart card (e.g., RFID) communication protocols are also provided by the present invention for deployments that involve MPTCs with smart card and/or contactless capabilities. In addition, appropriate memory and processing power are provided depending upon the card and processing system requirements for any given deployment. Further, appropriate security hardware and software measures are employed as will be appreciated in accordance with typical measures provided for electronic commerce transactions.

The terminal, in whatever form, acts as the link between the user of the personally identifying transaction instrument (e.g., MPTC or biological identifier) and the computing system that executes the software of the present invention. The software provides the programming for executing the various functions and features of the present invention including, by way of example and not limitation, communications, security, credit or debit card processing via financial institution network and data processing system, benefit operation including rewards and prizes, randomization, virtual ticket book generation, lottery drawing operation, account management, transaction management, reporting, settlement, point-of-sale, player management, lottery offering management and hardware management. The present invention software is further adapted appropriately to interface with third party software that may accompany any third party hardware used in accordance with the present invention, such as, for example, reader software associated with a hardware reader element.

One Embodiment of System Operation

Figure 3A:
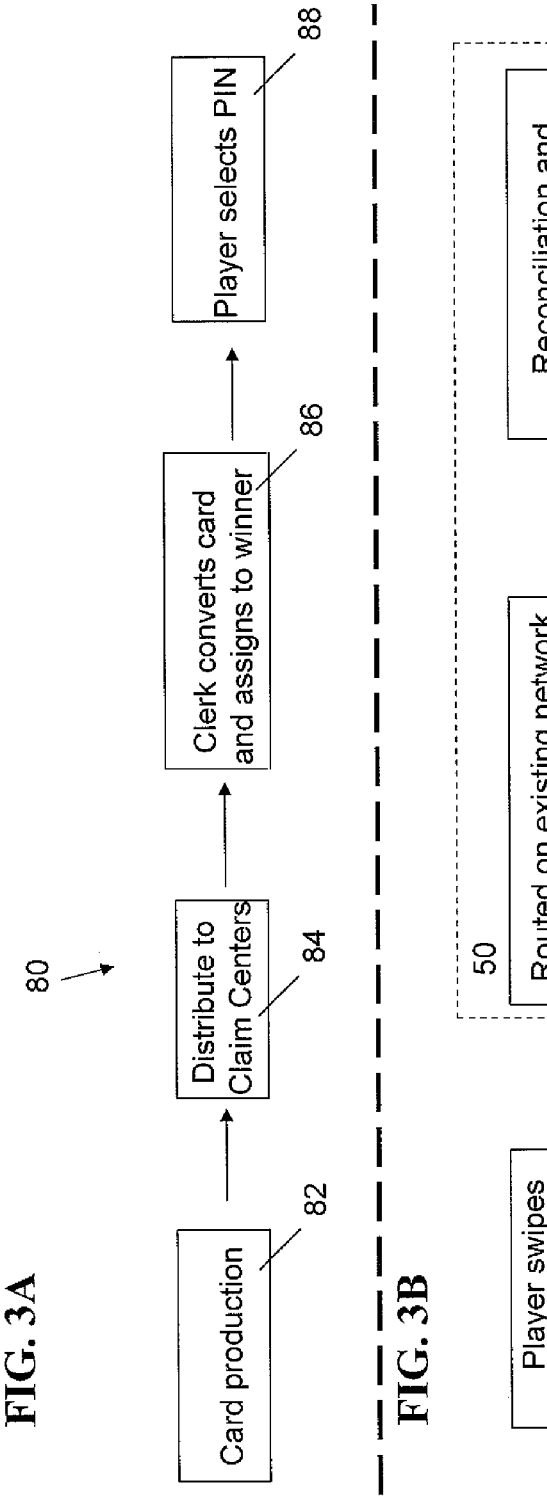
FIG. 3 is a flow diagram illustrating card issuance and card usage process steps in accordance with one aspect of the present invention.

As shown in FIG. 3A, cards are issued and used in one embodiment of the present invention. In process 80, a card provider produces the MPTCs as at 82 and distributes them to lottery claim centers as at 84. When there is a high tier winner (or optionally any winner) of a lottery offering, a lottery clerk at the claim center provides a converted MPTC (i.e., making the MPTC a value-applied transaction instrument, or VATI) to the winner as at 86 and the player can select a personal identification number (PIN) for use with the card as at 88. The cards as initially produced can have more than one transaction-enabling indicia thereupon, such as the magnetic stripe and barcode described above. Such indicia can enable both lottery and non-lottery transactions assuming the cards are active and readable by machines operated as part of a lottery and non-lottery system, for example. However, when initially produced, the cards have no cash value and may not be used for credit, debit or stored value purchases. In one embodiment of the present invention, the winner of any lottery offering can be provided with a card.

When the claims center clerk is notified of the winner of the lottery offering, such as when the winning ticket holder appears to claim the prize winnings, the clerk can validate the ticket through the lottery network as is known in the art, and can then apply the winning amount (e.g., as sent from the lottery operator to the lottery system provider) to the card. For purposes of the present disclosure, applying funds or a funding amount to a card can mean applying funds to an account associated with the card, or directly to the card itself. The funds can be prizes awarded as a result of a gaming event, such as a lottery drawing or instant ticket win (whether high tier or low tier, and whether a virtual or a real world ticket). The funds used to fund the account or the card can optionally be provided through another type of transaction other than a win from a lottery offering, such as, for example, when the user wins a prize associated with a non-lottery purchase as described elsewhere herein (i.e., a non-lottery offering).

The account associated with the card can be a financial institution account established by financial institution data processing system 55. When the prize claimant appears at the claim center, the claimant can establish the account for use with the present invention. The account can be established by a computer associated with the lottery data processing system sending a communication over a communication link such as a communications network, for example, to a financial institution data processing system to open a new account and/or request the opening of a new account. In one embodiment of the present invention, the account is established in the name of the prize claimant. In another embodiment of the present invention, the account is established in the name of an account custodian, which can be the lottery service provider in a specific embodiment. In yet another embodiment of the present invention, the financial institution account is opened using a wagering syndicate identifier so as to permit syndicate wagering as described elsewhere herein. The funds used to open the account can travel directly from the lottery system operator (e.g., the state holding the lottery drawing won by the prize claimant) to the financial institution, such as by wire or other known method. Alternatively, the funds can be delivered from the lottery system operator to the lottery data processing system by wire or other known method. The lottery data processing system can then fund the financial account in the amount of the winnings. In one embodiment of the present invention, the funding amount for the financial account is less than the actual prize winnings, because taxes, expenses, fees and any other deductions may be taken prior to the funds being deposited in the account.

In one embodiment of this aspect of the present invention, a request is issued from a lottery data processing system to a financial institution data processing system to open an interest-bearing financial institution account associated with winnings from a lottery or non-lottery offering. A first funding amount is communicated from the lottery data processing system to the financial institution data processing system based on the winnings in order to fund the account, with the account having a balance initially in the amount of the first funding amount. The first funding amount can be the amount of the total winnings, or a different amount based upon any deductions, expenses, fees, taxes or other deductions having been withdrawn. A card machine as described herein can associate the account with a multi-purpose transaction card by scanning or otherwise transferring information to the card via the card indicia, which enables the card to be used by a consumer (e.g., the winner) for lottery transactions as well as non-lottery transactions. As the card is used for transactions (e.g., purchases, wagers, top-ups), the account balance is either increased or reduced accordingly. Further, interest earned on the account over time can be applied to a custodian earning account not associated with the consumer. In this way, the present invention provides for the derivation of non-transaction related earnings from a winning game play.

In one embodiment of the present invention, once the funds are in the account, the clerk employs a machine to convert the MPTC to a value-applied transaction instrument (VATI). The machine can be a card writer that writes information to the MPTC via magnetic stripe, bar code, chip or other method, wherein the information associates the financial account with the card to enable the card to be used for purchase and other transactions (e.g., as a debit card).

In another embodiment of the present invention, no financial institution account is opened, and the funds are essentially applied directly to the card to enable the card to function as a pure stored value type of card. In this embodiment of the invention, the card is converted to a VATI without an associated financial institution account, and the card acts as a bearer instrument representing the equivalent of cash. In such an embodiment, the VATI can be used in a system operating using a client-server architecture, distributed architecture or combination architecture described above. Depending upon the desired system implementation, the converted VATI card can be such that it only works in a client-server architecture such as described above, or such that it works equally well in any of the system architectures described above.

In another embodiment of the invention where cards are not employed and one or more of the user's biological identifiers (e.g., eye scan, fingerprint, voice) is used as the transaction instrument, the identifier employed becomes the value added transaction instrument or VATI. In such embodiment, the clerk can record biometric information from the user at the time of prize redemption, and instead of issuing a converted card to the user, the clerk operates the machine to open the financial account and fund the account in the amount of the winnings. The clerk then associates the account with the recorded biometric information such that, whenever the user employs the biological identifier for the purposes of a transaction, the identifier is, in fact, the VATI, and is capable of depositing and withdrawing funds from the account, as well as participating in the other aspects of the present invention. In one embodiment of the present invention, when the user appears at the claim center to redeem his or her prize, the user can be offered the option of receiving a VATI in the form of a card as the transaction instrument, a mobile communications device as the VATI, or the user's own biological identifier as the VATI.

Once established and activated, the user can use the VATI as a type of debit or stored value card, as the card has been credited in the amount of winnings, less any transaction fees, required tax payments or other fees that might apply at the time of redemption. At the time of card issuance, age verification for responsible gaming purposes can occur as well.

In addition to being activated for transaction purposes, the VATI can be used by the user to establish favorite numbers, favorite wagers, and other personally appealing features using the CRM component of the present invention. In one embodiment, the user can access a web site using the VATI and the user's PIN for such purposes, and can establish a lottery system account associated with the VATI and/or the player's name. The user can also elect for any future winnings from lottery offerings or other transactions to be applied to the account.

Figure 3B:
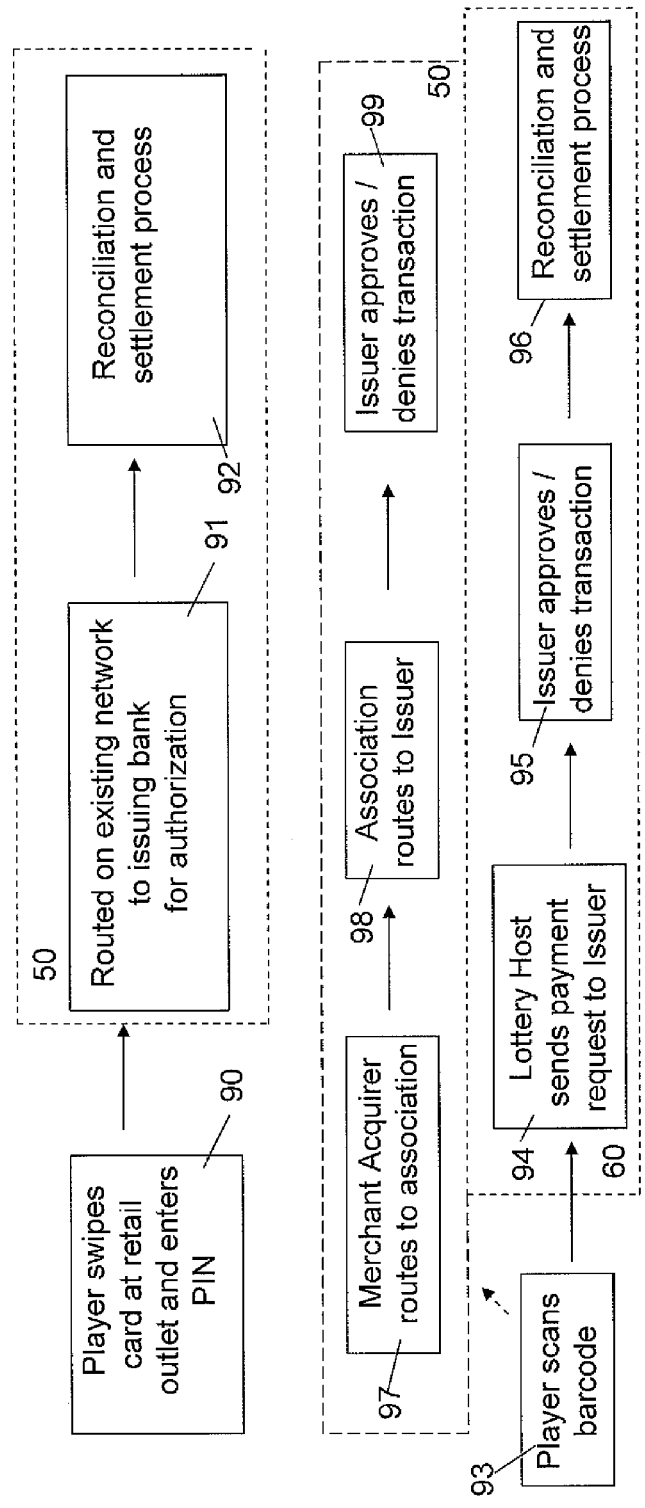

With reference to FIG. 3B, on the association network 50, when the player accesses the non-lottery transaction feature of the VATI, such as by having the magnetic stripe on the card swiped at the retail outlet and entering the PIN as at 90, the transaction is routed on an existing network to an issuing bank as at 91 to authorize the transaction, and the normal reconciliation and settlement process occurs as at 92 once the issuing back approves or denies the transaction.

On the lottery service provider (LSP) network 60, when the player accesses the lottery feature of the VATI, such as by having a barcode on the card scanned at the retail outlet as at 93, the lottery host sends a payment request to the issuing bank as at 94. The issuing bank approves or denies the transaction as at 95 and the reconciliation and settlement process takes place as at 96.

In one embodiment of the present invention, a single indicia can be used to conduct lottery and non-lottery transactions (with appropriate split routing to each network) and the card would therefore require no other indicia. Thus, as shown in FIG. 3B, for example, the reading of the bar code 93 can result in lottery transactions moving through lottery network as described above, and non-lottery transactions moving through association network 50 via the dashed arrow. As shown therein, the merchant acquirer routes the transaction to the association as at step 97, the association routes to the issuing bank as at step 98 and the issuing bank approves or denies the transaction as at 99. In an alternative embodiment of the present invention, the magnetic stripe can be used to conduct all types of transactions (e.g., lottery and non-lottery transactions, with appropriate split routing to each network) and the card would therefore require no barcode. In one specific embodiment, the swiping of the magnetic stripe on the card and/or the reading of the barcode on the card would simultaneously divide non-lottery transactions into the association network and lottery transactions into the lottery provider network. In a further embodiment, a single barcode on a mobile communications device can be employed.

The split routing of transactions with an MPTC and/or VATI benefits the lottery service provider, the lottery operator and the lottery retailer. In one embodiment of the invention, both low tier and high tier winnings can be managed the same way. Optional enrollment features may also include player favorite numbers, auto-pay, loyalty awards and cashless or paperless wager options. In one embodiment of the present invention, different amounts of reward points or loyalty points can be awarded for an open loop transaction versus a closed loop transaction. Thus, for example, if a user has $100 on his or her MPTC and spends $50 on an open loop transaction, he or she may receive 50 loyalty points, whereas if the user spends the other $50 on lottery transactions, he or she may receive 100 loyalty points. Such differing rewards point amounts can be changed by an administrator of the system based on desired incentives.

Business rules can determine the revenue distribution from the system. In one embodiment, the lottery service provider keeps the interest that is earned on the funds that are held in the service until they are paid to the winner. In one embodiment of the present invention, the winner may be given the option at the time of receiving the VATI card to either have the card registered in a lottery service provider financial account, whereby the user can maintain anonymity, or registered in the personal name of the user, to facilitate better personalization and qualify the user to receive federal or state tax documentation and recording features (such as, for example, receiving a United States tax form 1099 to deduct wagering losses). Further, the transaction processor may keep any transaction fees that are paid. Service charges are a further source of potential revenue. Inactive accounts can be turned over to the government at time periods that vary from jurisdiction to jurisdiction.

In a further embodiment of the present invention, some or all prizes for a particular game can be designated as payable exclusively via a card as provided in accordance with the present invention. Further, a prize can be increased if a person puts the prize on a VATI card rather than asks for cash. (e.g., $100 winner becomes $105 if payment is made via debit card). Payment via card reduces the risk of fraud associated with paper tickets and paper validation receipts.

In this regard, the present invention contemplates additional consumer protection and/or fraud prevention measures that can be employed with or without the VATI described herein. With regard to online games, an identifier (e.g., a random symbol generated by the lottery host) can be automatically assigned to a player at the outset of an online game, and this identifier follows the physical game ticket (where employed) through the game play process. According to this aspect of the present invention, a player receipt would have any type of randomly generated identifier (such as a three letter sequence (e.g., "ABC")) printed on the top of the ticket receipt, and a copy of the ticket identifier would be stored in the transaction record. In one embodiment of this aspect of the present invention, upon the reader terminal reading a transaction card, the terminal can direct a printer to print the player's name on the wager receipt if his or her name has been stored in connection with the card account. Further if a player has stored favorite wagers with the account, he or she can identify favorite wagers to be played, whereupon the system of the present invention recalls the favorite wagers upon reading the card, and further prints the player's name on the ticket receipt. If the ticket is a winner, the winner selection process would copy this identifier to the winner's file and the identifier would be printed on the validation receipt when the customer presented the ticket for validation. In an alternative embodiment of this aspect of the present invention, the player could use a single identifier on their card, which can be scanned by the retailer at the time of the transaction each time the player purchases an online game ticket. In this embodiment, the retailer simply scans the card using a barcode reader, and the personal identifier enables the player to be sure that the retailer is returning the correct validation receipt.

Regarding the presentment and reading of the card at a point-of-sale or other terminal, the present invention incorporates reader technology as disclosed above. In one embodiment of the present invention, as shown in FIG. 2, for example, one or more reader terminals 20 are provided in communication with the lottery data processing system and the financial institution data processing system. The reader terminal is capable of reading at least a portion of the VATI and communicating a transaction amount to the financial institution data processing system in order to change the balance in the financial institution account. For example, if the user of the VATI is purchasing $50 worth of merchandise, the reader can scan a barcode or read the magnetic stripe on the card and communicate with the financial institution data processing system to deduct $50 from the financial account balance. Any association and/or other transaction fees accompanying transactions contemplated by the present invention will be assumed to be present, but will not be discussed in detail, as such fees are ordinarily accommodated and understood with credit and debit transactions. The reader terminal can operate equally well in handling account deposits (such as where the user wishes to "top up" his or her account using other funds, which may be cash or another credit card, for example), account withdrawals, lottery transactions, non-lottery transactions, application of prize amounts to the account balance and other transactions. When applying prize winnings, the terminal can first communicate with the lottery data processing system via lottery network in order to validate the ticket or game identifier associated with the winnings before crediting the associated account. Also, in the embodiment where no financial account is employed but wherein the VATI holds the cash equivalent value of the balance, the reader terminal can conduct the same types of operations (i.e., withdrawals, deposits, etc.) through the VATI.

With regard to lottery transactions, the reader terminal can read at least a portion of the VATI in order to associate a wager with the VATI without paper or cash. This can occur, for example, by sending a communication over the lottery network to the lottery data processing system 65, whereupon the wager is noted and associated with the player's lottery system account. The reader can further read at least a portion of the VATI in order to initiate a winning wager redemption process without paper or cash. This can occur, for example, by communicating a query to the lottery host to determine whether the winning ticket or wager representation is valid, and if so, the host can authorize the terminal to communicate either with the card or the financial account associated with the card in order to apply the winnings. In one embodiment of the present invention, the lottery data processing system communicates the winning amount to be applied to the financial account directly, without communicating back through the terminal.

Winning When Buying

When a lottery player participates using the value-applied transaction instrument or a similar loyalty card in accordance with the present invention, additional benefits can be made available.

Lottery players enjoy the gaming aspects of wagering. Not knowing whether the next play is a winner or a loser and not knowing the amount of the win are all part of the excitement and anticipation for a player. One aspect of the present invention enables players who use a VATI card to receive a random benefit in return for using the card. Other card systems are known to provide benefits to the card holder based on using the card (e.g., airline miles, cash back, gasoline credits, etc.), but none randomize the reward. Typically, the worth of the benefit or reward is dependent upon the amount of purchase. The benefit can be sponsored by any of several entities, including a retailer, manufacturer, service provider, lottery operator, lottery service provider or private group, for example.

Figure 4:
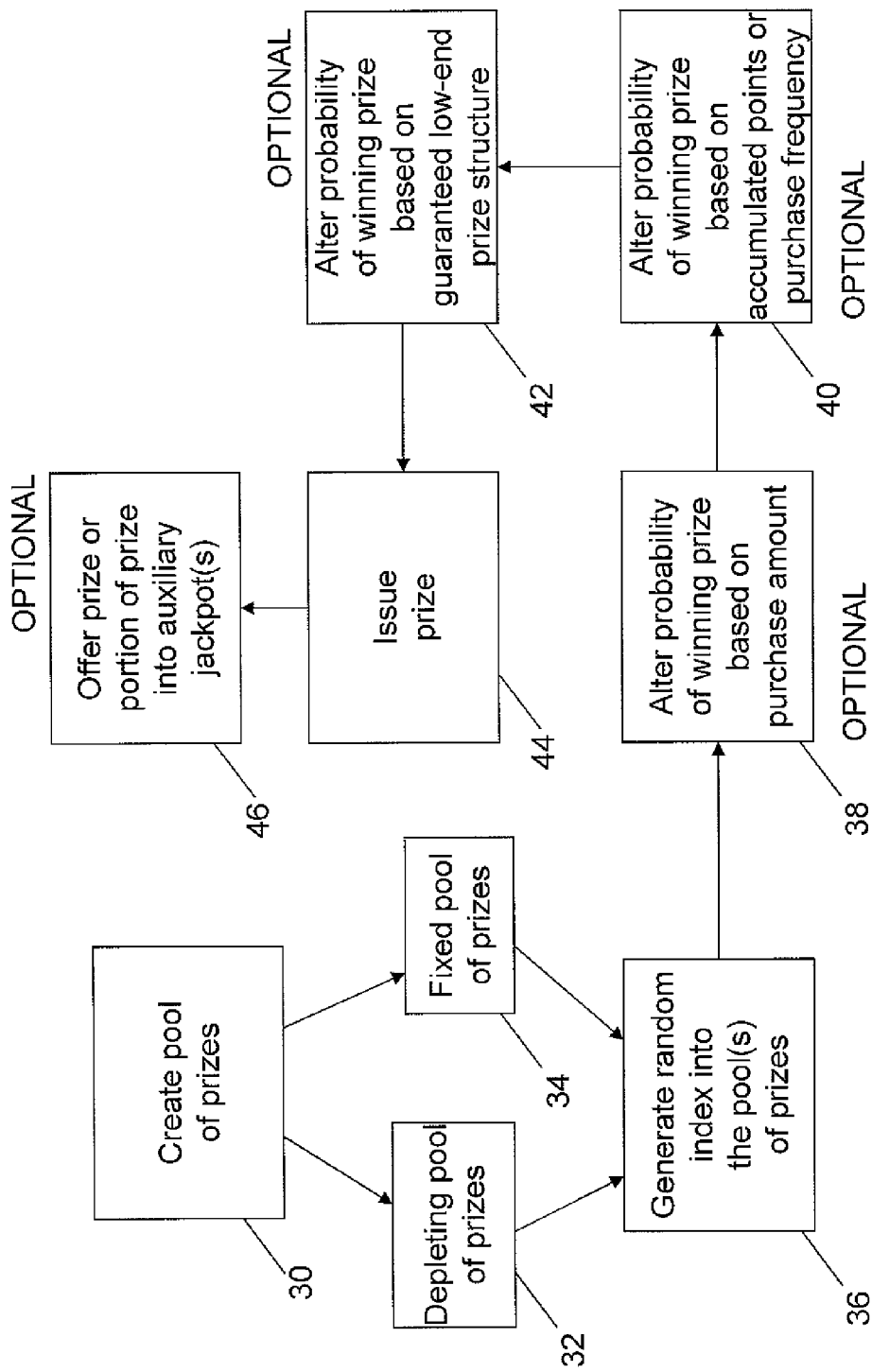
FIG. 4 is a flow diagram illustrating a method of winning when buying in accordance with one aspect of the present invention.

By the present invention, the amount of the benefit is determined wholly or partly via random chance, rather than just by the purchase amount. This reward method is particularly beneficial where a card having lottery network capabilities is used to make a purchase. Some examples of how the present invention implements this aspect are illustrated in FIG. 4 and processed as follows:

As shown in FIG. 4, a 'pool' of prizes is created as at step 30, where the probability of winning any particular prize is indicated in the pool. The pool can be created by a gaming processor associated with a lottery host, in one embodiment of the present invention. The pool may be depleting (i.e., when a prize is won it is removed from the pool) as at step 32, or the pool may be fixed (i.e., prizes are not removed) as at step 34, or some of each type. In one embodiment of the present invention, the pool is automated such that it can replenish, replace, shrink or append existing pools based on the desires of the sponsor running the benefit program. As an example, if the sponsor desires the pool to be replenished once a larger prize is won, the gaming processor can run a pool management program to automatically add a new pool (with larger prizes now available) into the existing pool. In one embodiment of the present invention, the pool selection options can be presented to a sponsor via a computer user interface.

When paying by lottery player card (which may be the VATI, or a credit, debit, prepaid, stored value card or no-value/membership card for example), the reader terminal communicates to the lottery host that a user of the card has initiated a transaction at the reader terminal, whereupon the gaming processor generates a random index into the pool of benefits as at step 36, and retrieves a selected benefit that is awarded to the user instantly, as at step 44. The prize can be additional bonus points, cash (e.g., payable immediately by the retailer), a discount (e.g., up to 100%) in the purchase price, a merchandise prize (e.g., a voucher is generated), a voucher for free or discounted tickets in one or more lottery games. Note that the prize need not be just one or two tickets, but can be hundreds or even thousands of tickets.

Prior to issuing the prize, one alternative embodiment of this aspect of the present invention alters the probability of winning a prize based on the purchase amount, as at step 38. For example, for each $1 in purchases, the buyer gets 1 chance to win an instant prize. Yet another embodiment alters the probability of winning based on other factors such as total points accumulated during a time period or purchase frequency as at step 40, or frequency of past wins or losses as at step 42 (e.g., personalized GPS as described below).

As indicated by step 46, multiple winning possibilities can be provided, some of which are offered by the store where the item is purchased or via membership in a group that offers a prize (see also multiple localized jackpots as described below).

In one embodiment of the present invention, the VATI is employed and the selected benefit is in the form of a winning cash amount, whereupon the reader terminal automatically communicates the winning cash amount to the financial institution data processing system so as to increase the balance of the financial institution account associated with the VATI. Alternatively, the reader terminal can communicate the winning cash amount directly to the VATI in the embodiment where the value is stored directly on the VATI.

Personalized Prize Structure

Another benefit that can be made available in accordance with the present invention gives players a winning experience comparable to traditional instant tickets. Traditional instant tickets are typically packaged and distributed using the concept of GPS (Guaranteed Prize Structure). This can mean, for example, that the lottery or instant ticket provider guarantees that each book of tickets contains a certain number of low-tier winners and also guarantees that there are never more than "n" number of consecutive losing tickets in the book (sometimes referred to as the "Losing Run Limit" or a guarantee of a frequency of wins). Non-GPS prizes (e.g., high winners) are "sprinkled" in a random fashion among all books.

One aspect of the present invention introduces a guaranteed prize structure (GPS) to online instant tickets, while enabling a much greater latitude of implementations. For example, the present invention can incorporate GPS on a per store basis (or per terminal), on a personal level, or on any other level (e.g., office groups, etc.).

Figure 5:
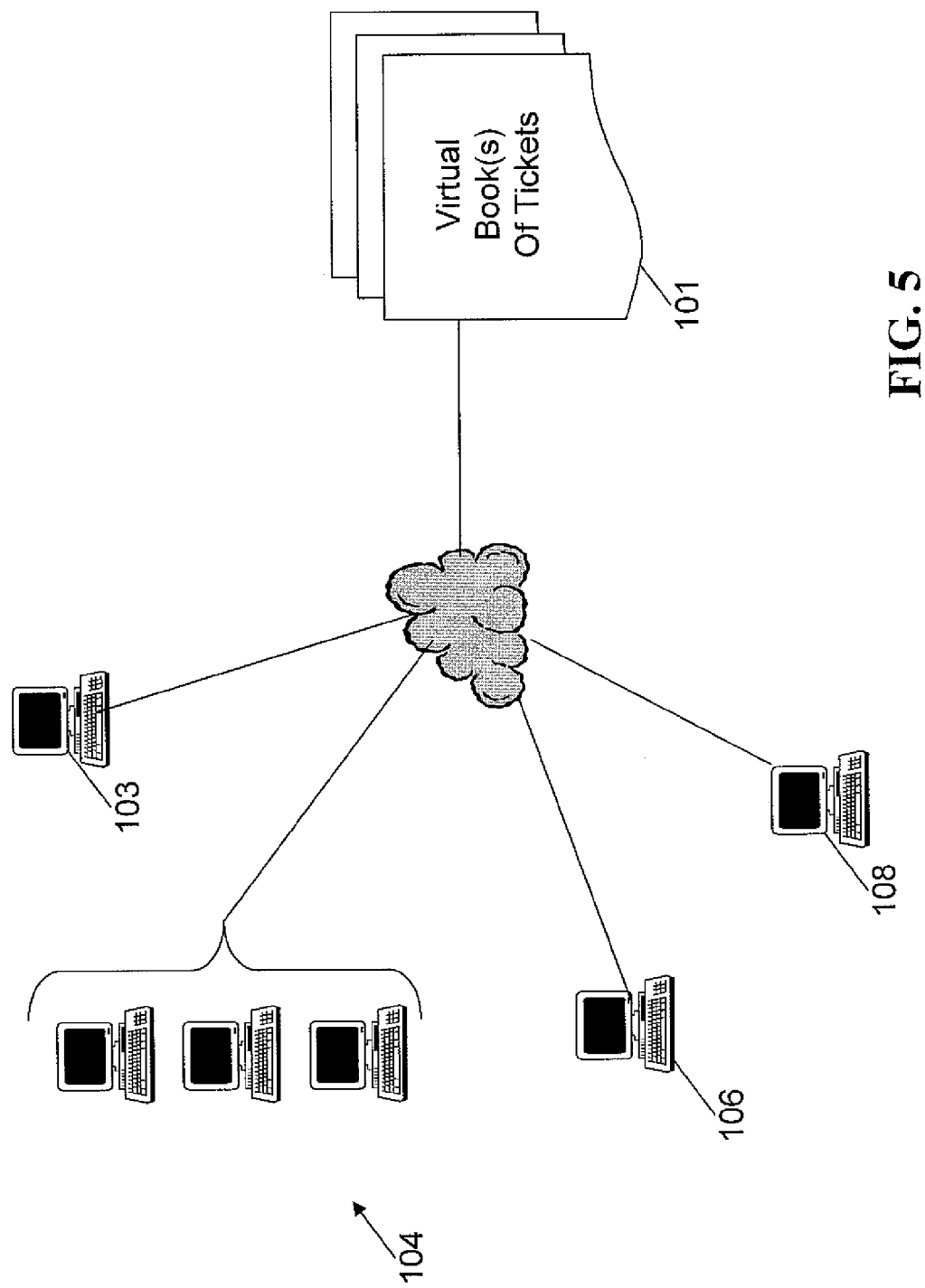
FIG. 5 is a sample system architecture that can be employed with a personalized guaranteed prize structure as implemented in accordance with the present invention.

As shown in FIG. 5, the present invention achieves this by establishing a virtual book or virtual books of tickets 101. These books can be selected and associated with a particular entity online. The gaming processor associated with the lottery host can generate the virtual book and the host can associate the virtual book with the user's lottery account. The gaming processor can further include/implement a guaranteed prize structure with the virtual book. Thus, for individuals, any time the user buys a ticket, the user can be identified in the system (such as by having a VATI read, or by having a player membership card read) and the lottery host can determine what prize, if any, is to be awarded to the user based on the associated book. Virtual books of tickets are, as the name implies, not hard copy tickets that are printed and held in hand. Rather, they are established and maintained electronically.

In one embodiment of the present invention, the lottery host associates the book with at least one reader terminal in communication with the lottery data processing system. The reader(s) can be affiliated with a particular retailer, for example, such that the retailer gets the benefit of players knowing that the retailer will, at worst, only have so many losing tickets in a row before a winning ticket emerges.

The entity associated with a virtual book of tickets can be an individual 103, a group of individuals 104, a company or other organization 106, a retailer or a personalized/auxiliary jackpot 108. With the use of a card as described above, the lottery system can associate an established virtual book of tickets with an individual card at the time the card is issued. So, for example, when the lottery system identifies a particular player 103 (e.g., via VATI or simple player card) and that player purchases a ticket for a particular game, the player is actually getting a ticket from a GPS book which is allocated to him or her alone. This does not really give the player a better chance of winning, but guarantees that the player will never buy more than "n" tickets without a winner, and that he or she can expect to win at least $x for every "y" number of tickets he or she buys. This feature can be explicitly stated in the game literature, or not publicized at all.

Traditional instant tickets have nothing similar to personalized GPS. If a player knows that each time the player purchases a losing ticket, he or she has increased the probability of the next ticket being a winner (via the Losing Run Limit), then he or she may be more apt to play again, which could result in a greater number of online plays (and ticket sales).

Associating virtual books of tickets with retailers (e.g., 106) or groups of retailers (e.g., 104) provides them with the same advantages that they have today with traditional tickets. For example, a player will not get too many consecutive losers in the store, which could cause him to label the store as "unlucky." Stores that elect to offer online or electronic tickets can incorporate personalized GPS into their gaming offerings.

Multiple Localized Jackpots

Another benefit made available in accordance with the present invention gives players a new/additional method of winning with existing games in the form of multiple localized or auxiliary jackpots. This aspect of the present invention provides instant win possibilities when wagering.

Lotteries may occasionally take some percentage of lottery wagers and put that percentage into a jackpot that may be won randomly. The present invention allows a ticket to be eligible for one or more additional localized or personalized jackpots with various ways of funding the jackpots.

For example, all of the following types of jackpots could be available when a ticket is purchased:

(1) A company, e.g., Amgen Inc., could sponsor a separate jackpot (e.g., $100-$10,000) for its employees. Whenever their employees buy a lottery ticket, using a VATI or simple player card or some other way of identifying them as employees, they could be eligible for the Amgen Jackpot. The player's wager or fee to participate in the company jackpot can be funded by a portion of the ticket purchase, a separate fee paid by the player, the player's winnings of the traditional jackpot, or simply by the player using the card.

(2) A store chain (e.g., Krogers™ or 7-11™ Stores) could sponsor a jackpot only for people who buy lottery tickets in one of their stores (perhaps even funded in whole or in part using their commissions). The player's wager or fee to participate in the retailer jackpot can be funded by a portion of the ticket purchase, a separate fee paid by the player, the player's winnings of the traditional jackpot, or simply by the player using the card.

(3) A charitable group could sponsor a jackpot which is funded by players whenever they use their player card to make a wager (perhaps the jackpot is split 50-50 between the player and the charity).

(4) A local restaurant or bar could fund a small jackpot for keno players who play in their establishment.

Figure 6:
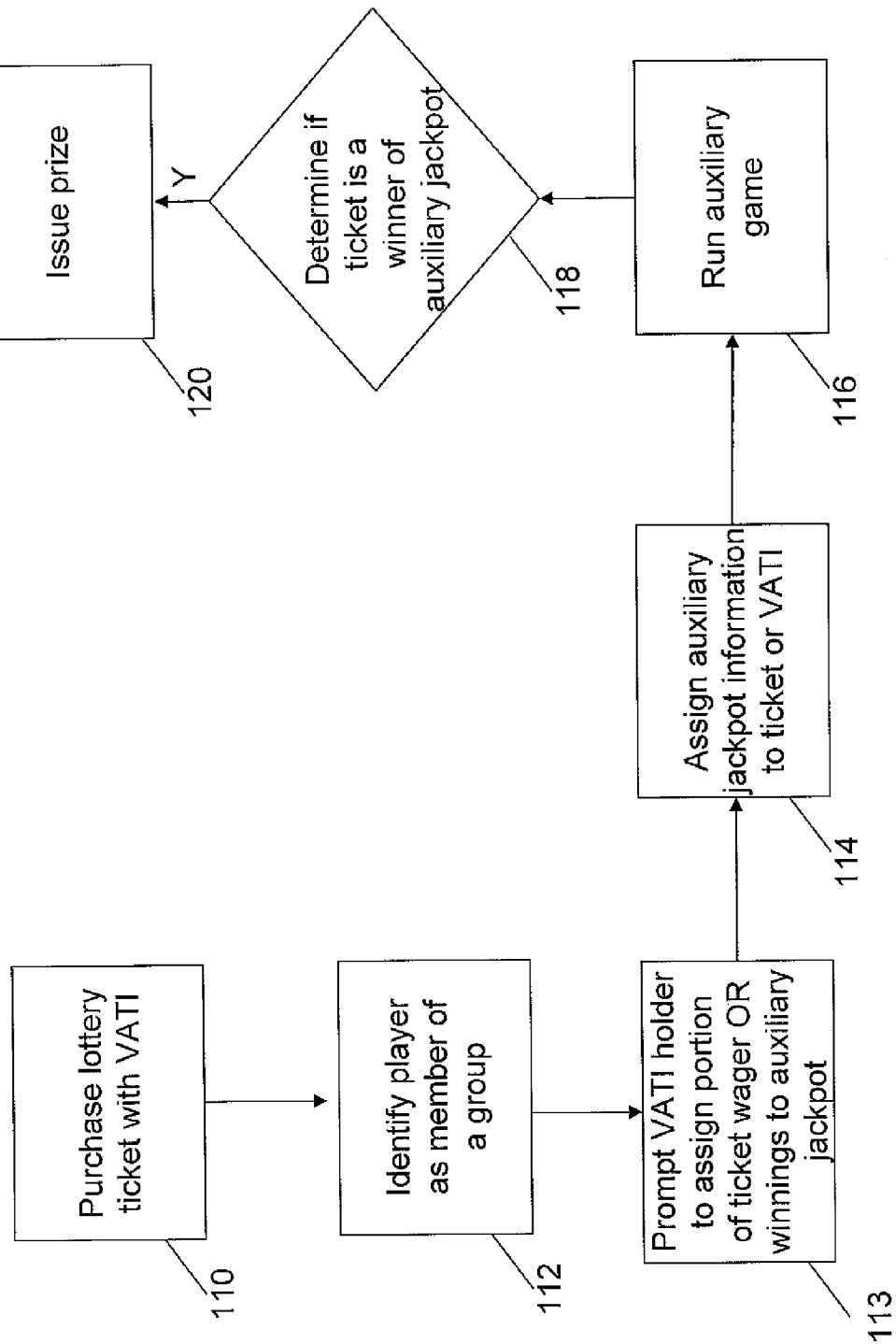
FIGS. 6 and 7 are sample flow diagrams illustrating methods of providing and implementing multiple localized or auxiliary jackpots in accordance with one aspect of the present invention.

(5) A family or group of friends could participate in a jackpot where, for example, each time a family member places a wager, some part of their wager (or winnings) gets put into a jackpot for that family. As shown in FIG. 6, at step 113, the player can be prompted by the system of the present invention to divert a portion of his or her ticket wager or winnings to the auxiliary jackpot. In such an embodiment, rules can be established such that, for example, only family members are eligible to win.

(6) An individual may ask that a certain percentage of all their wagers (or winnings) be put into their own personal jackpot (or via a credit/debit card—see below).

In the above examples, the player can register or associate his or her VATI or simple player card with one or more of various groups in order to take advantage of the additional jackpots. For example, if the player wins a lottery with a prize of $100,000, and the player is issued a VATI as described above, the player can associate the VATI with his or her employer, church group, favorite or most frequent store chain or dining establishment, and/or separate personal group (e.g., family and friends), for example. The player may associate more than one group or jackpot with the VATI. Later, at the time of making purchases (lottery or non-lottery) and depending upon the rules associated with contributing to each group's jackpot, the VATI holder can be prompted by the system of the present invention to contribute to a personalized jackpot. In one embodiment, where the user VATI is identified through scanning at a retailer POS terminal, the terminal can prompt the user for jackpot affiliation associated with the current transaction. In a self-service example, similar to a cash withdrawal from an ATM machine where pre-determined withdrawal amounts are presented on the user interface for selection, the present invention can provide selection options for localized jackpots for the user to participate in.

Figure 7:
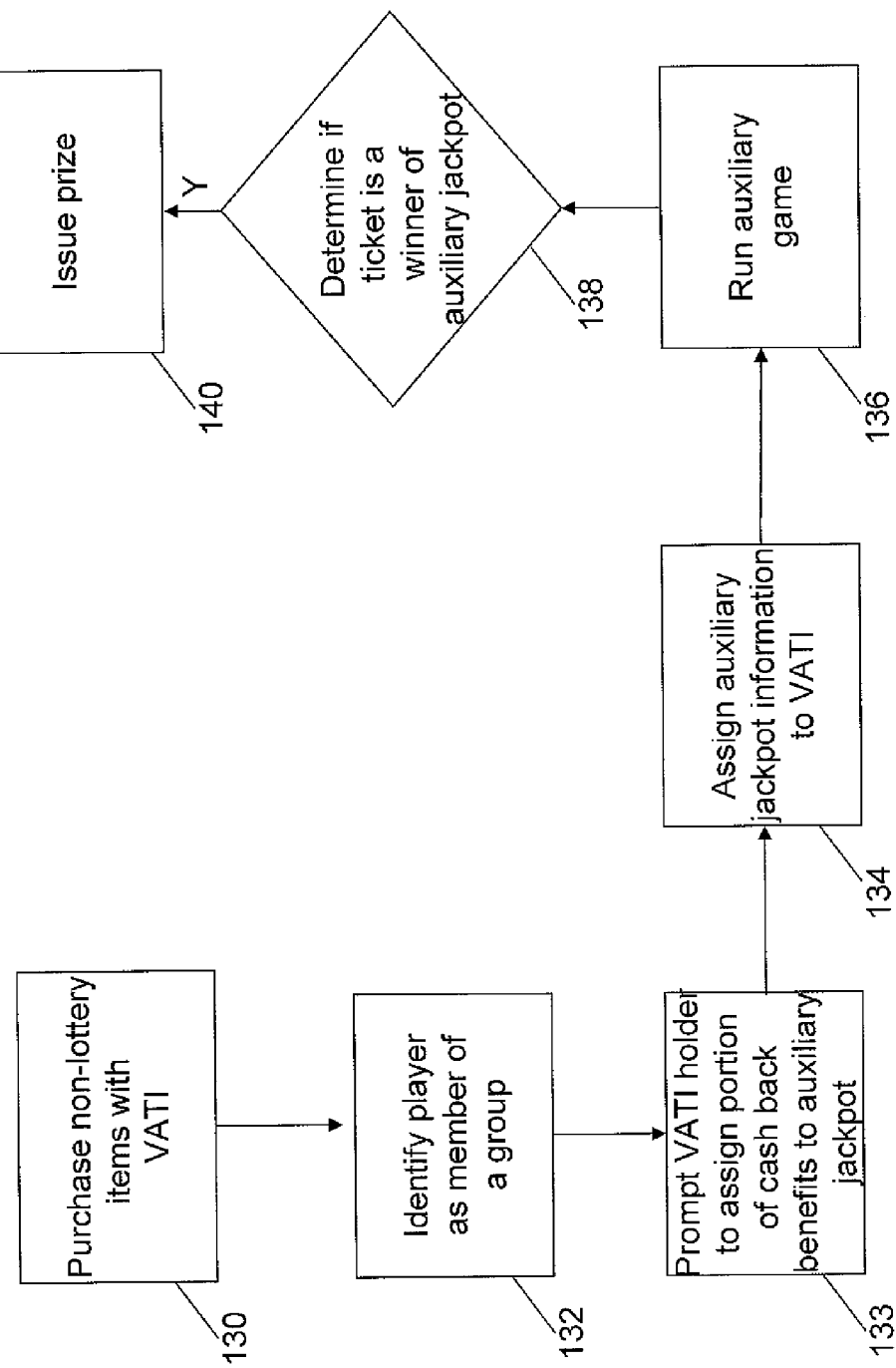

FIGS. 6 and 7 show flow charts of example implementations of this aspect of the present invention. As shown in FIG. 6, a wager is made, such as the purchase of a lottery ticket, and the player's VATI is presented as at step 110. At step 112, the system of the present invention identifies the player by his or her VATI. The player can be identified as a member of a group, such as a family member, corporate employee, charitable organization contributor, retail establishment patron, fantasy football group member, virtual world team member, individual within a group of friends, or other. At step 113, the player is prompted for an answer as to whether the player wants to assign a portion of the player's wager to the auxiliary jackpot, or assign winnings (or a portion thereof) to the auxiliary jackpot. Such a prompt can be incorporated into the present invention by sending appropriate instructions from the lottery system to the terminal where the user has presented his or her VATI. If the terminal is manned by retail personnel, the retail personnel at the terminal can read the prompt and ask the user for an answer. If the terminal is self-service, which can include the user's own personal computer or mobile communications device, the terminal can present the selection to the user for response by touch-screen, oral response, keyboard entry or other known data entry means. Software coding is provided centrally and/or locally to facilitate these processes.

It will be appreciated that, if the user opts to designate a portion of the player's wager to the auxiliary jackpot, the portion can be paid out of the retailer's fee receipts for handling lottery transactions. Upon receiving the user's selection, the system then associates the auxiliary jackpot information with the ticket and/or user VATI, as at 114. It will further be appreciated that the funding of any auxiliary jackpot can occur in several ways and by any of several entities (including, for example, by the user, retailer, charity, gaming establishment, employer, etc.). Depending upon the user's selection and the timing of the primary game, the user may have now established some interest in the auxiliary jackpot (either through the designation of a portion of the lottery ticket purchase to the auxiliary jackpot or designation of winnings (or a portion thereof)). Upon the running of the auxiliary jackpot as at 116, a determination is made as at 118 to see if the user is a winner of the auxiliary jackpot, and if so, a prize is awarded as at 120. Cash prizes can be associated with the holder's VATI, and automatically added to whatever balance is associated therewith.

In another embodiment of this aspect of the present invention, when a player designates that a portion of their winnings are to be put into a jackpot, the lottery may match a certain percentage of it.

As shown in FIG. 7, this aspect of the present invention can also occur when the user makes a non-lottery purchase using the VATI. At step 130, the user purchases non-lottery items with the VATI. At step 132, the system of the present invention identifies the player by his or her VATI as a member of a group such as detailed above. At step 133, the user is prompted to assign all or a portion of any cash back proceeds from the non-lottery transaction to the auxiliary jackpot. At step 134, the auxiliary jackpot information is tagged to the VATI. Upon the running of the auxiliary jackpot as at 136, a determination is made as at 138 to see if the user is a winner of the auxiliary jackpot, and if so, a prize is awarded as at 140.

It will be appreciated that, for any ticket purchase, a player could be eligible for multiple jackpot wins (e.g., an Amgen employee buying a ticket in Krogers). Further, the jackpot drawings or win determinations can take place at different times, such that the player can create the chance to win several jackpots at the same time, while waiting to receive a determination as to whether the player won any of the jackpots at different times as the individual jackpot winner determinations are made.

In an alternative embodiment of the process shown in FIG. 7, a portion of each purchase using the VATI can be placed into a jackpot for the individual or family by the retailer (or by specific product manufacturers or service providers), rather than the player assigning cash back benefits into the jackpot. In another embodiment, the non-player provided funding can be combined with player-provided funding. Further, the player-provided funding can be a combination of funding such as cash back amounts, rebate amounts, coupon amounts, amounts in the form of change from cash transactions, additionally designated amounts at the time of purchase (e.g., the transaction amount is $100, but the individual elects to pay $105 and designate the extra $5 for the auxiliary jackpot).

In these embodiments, the player has a unique player VATI, such as a card as described above. For group play, each member of the group has such a card and the cards are linked together by the system of the present invention to faun the group.

In one embodiment, the jackpots are paid according to the following process:

(1) Each time a person in the group places a wager, the gaming processor of the present invention generates random numbers that will be used to determine whether the person or group will instantly win any jackpots for which they are eligible. The odds of winning each jackpot could be variable somehow depending upon the amount in the jackpot or on the particular rules established by the sponsors or groups.

(2) The odds of winning the jackpot could vary depending upon the amount contributed.

(3) All jackpot wins can be instant wins or payable only if the ticket were to win some other prize.

In a further embodiment of this aspect of the present invention, a game is set up to match the game that the player has selected for "real-world" play. For example, if the player is making a selection of five numbers for a drawing in the real-world, a virtual drawing can be established for the group to which the user belongs. When the player makes his or her number selections, the same selections can be attributed to the personalized jackpot. The personalized jackpot drawing may be operated in a virtual sense, as will be appreciated.

In one embodiment of this aspect of the present invention, if the player cards (e.g., VATIs) are universally unique, then the personal/group jackpot processing can be separate from the jurisdiction. This is especially useful for groups that are geographically separated, or for players who travel or are on state line boundaries. The player and group can view the current jackpots for which they are eligible by logging in to a designated website or other known means.

The lottery host can manage multiple special-interest games (i.e., localized jackpots), which are not available for play by the general public. Further, the machine used for converting the multi-purpose transaction card to the value applied transaction instrument can associate the instrument with at least one special-interest game such that the reading of at least a portion of the card indicia indicates that the VATI is capable of participating in one or more special-interest games. As disclosed, the VATI can be read and the user can be queried for whether the user wants to apply a full transaction amount to an account activity, or whether the user wishes to apply a portion of the transaction amount toward a gaming wager for a special-interest game. For example, if the user is depositing cash to be applied to the user's account, the terminal can ask the user if the user wishes to apply a portion of the deposit toward a special-interest game. Thus, in this example, the full transaction amount is not added to or subtracted from the account balance.

As a further example, upon the reader terminal reading at least a portion of the VATI, the reader terminal can prompt the holder of the card for a contribution to a gaming wager not connected to a game offered by the lottery data processing system to the general public. This can occur whether or not the user is conducting a lottery or non-lottery transaction. As a further example, upon the reader terminal reading at least a portion of the VATI, the reader terminal can prompt a holder of the VATI to decide whether to apply a rebate or cash-back offer towards a gaming wager for a special-interest game. Further, the reader terminal can prompt the holder of the VATI for a commitment to attribute at least a portion of any winnings from the initial wager with a gaming wager for a special-interest game.

In a further embodiment of this aspect of the present invention, the auxiliary jackpot can be associated with a sports wager or other "skill-based" game to the extent permitted and available for a given transaction. Thus, for example, if a player enters a restaurant where sporting events are displayed on televisions for patrons to view and where skill-based wagering is permitted, the player can use his or her card to purchase a meal or other items, and designate funds or points (depending upon the implementation) for a wager on one of the sporting events being displayed. If others in the restaurant are also participating, then a combined jackpot is provided and available for one of the participating patrons to win. The invention can apply to other skill-based games beyond sporting event wagering, such as, for example, card games, knowledge-based games, video games, virtual world games and the like. The invention can further apply to games that are considered "entered" based on a player paying an entry fee into an establishment, as opposed to a direct wager on a specific game. In one embodiment, the invention limits skill-based wagering to events that are determinative while the user is physically present in an establishment. In another embodiment of this aspect of the present invention, distinctions are made between games that the user is participating in (e.g., billiards or pool), and games that the user is not participating in (e.g., professional sporting event wager).

In addition to associating a VATI and/or simple player card with one or more of various groups in order to take advantage of additional jackpots, a card holder (VATI holder) can associate the card (VATI) with one or more other card holders (VATI holders) to form or join a wagering syndicate. The wagering syndicate may be formed, for example, to take advantage of the increase in odds of winning that occurs when more wagers are placed. Thus, for example, if five individuals were to play $25 worth of tickets, their chances of winning would be less than if $125 were wagered in gross. Thus, the five players might pool their funds and agree to split any winnings according to their individual contributions.

In accordance with this aspect of the present invention, two or more card holders (VATI holders) can register through the lottery service provider network to form a syndicate. Registration can occur at the time of issuance of a card (VATI), or afterward. Upon registration, a single member of the syndicate can be identified as the "captain" holding the "captain account" on behalf of himself or herself and the remaining syndicate members. Each member of a syndicate can then be identified such as through scanning at a retailer POS terminal, for example, and can be prompted at the point of identification for applying a given transaction or wager to the syndicate or keeping it separate from the syndicate. Thus, for example, if a card holder (VATI holder) places a favorite wager for a drawing by having his or her card (VATI) scanned at a POS terminal, the terminal may ask whether the card holder (VATI holder) is placing the wager individually or as part of his or her registered syndicate. If the player chooses to place the wager as part of the syndicate, then it is added to the captain's designated syndicate account.

In one embodiment of this aspect of the present invention, the system operates so as to automatically debit the player's account in the amount of the wager made as part of the syndicate. In another embodiment of this aspect of the present invention, the system operates such that, if the syndicate wagers result in winnings for the syndicate, then the winnings are automatically paid out or disbursed to each member according to his or her pro rata share. The system of the present invention can employ default and customized business rules to determine how the wager payments are made and debited, as well as how payouts are disbursed. The rules can be customized at the time of syndicate setup or later while employing various safeguards to ensure that all group members consent to the customized procedures for accepting wagers and distributing winnings. In one embodiment of this aspect of the present invention, each member of a syndicate can gain access to account information for the syndicate and view the number and type of wagers being made on behalf of the syndicate.

Employing Biometrics

In a further aspect of the present invention, biometric equipment and processes are employed to streamline ticket sales as well as to promote gaming wager data entry and ticket validation at the retailer. This aspect of the present invention provides a method and device for automated entry of wager data and subsequent validation of the winning data between a player and an online gaming terminal using an electronic online database and at least one player-bid biometric sample.

Biometric techniques and equipment have been employed for rapid and accurate identification and authentication of individuals within fields such as border control, building access control, and identity verification for computer logon privileges and authorizing electronic transactions, for example. Biometric techniques provide convenience for the individual by eliminating the need for carrying a physical form of identification and allowing fast identification by automated devices. They also provide security due to the complexity and difficulty involved in trying to replicate biometric data for live presentation. In some cases, biometric techniques are combined with other security processes (e.g., informational processes) to provide a multi-factor authentication/identification system.

Within the lottery field, many online lottery games use pre-printed paper forms or bet slips for the player to manually record their desired wager data for machine entry prior to a lottery drawing. These bet slip forms are supplied by the gaming system provider and represent an incremental expense for each point of sale transaction. Once the wager data is accepted by the online lottery system, a receipt or ticket representing the valid entry of the data to the system is printed by an online terminal printer at the point of sale. The ticket paper is also preprinted with lottery messaging and security numbers for tracking. These tickets also represent an additional incremental expense to the lottery provider for each transaction.

According to this aspect of the present invention, a fingerprint scanner (or other biometric information reader) is attached as a peripheral to a lottery terminal for the purpose of capturing a player's fingerprint (or other biometric information) at the point of sale. Also as an option, an alpha/numeric keypad is incorporated as either an additional peripheral or as part of the fingerprint scanner. During the registration process, bet slips are manually filled out by the player and scanned into the lottery terminal for assignment to the simultaneously collected fingerprint sample. The wager entries and resulting fingerprint scan are then forwarded to a lottery host or middleware server for storage in a database. It will be appreciated that a fingerprint scanner need not be the sole operative biometric device used in accordance with this aspect of the present invention. Other biometric equipment and techniques employed by the present invention can include, for example, iris recognition, retinal recognition, hand prints, voice recognition, facial recognition, signature stroke recognition or any combination thereof. The stored biometric imprint along with the stored wager entries allow for automated entry of wager data and subsequent validation of the winning data.

In one embodiment, this aspect of the present invention can employ a process flow as follows:

[a] In a player registration step, the player registers at a wagering terminal to an on-line database at least one registration biometric sample read from a biometric sensor, and at least one set of wager data. As an option, at least one set of player identification data (such as a personal identification number (PIN), password or the last four digits of a phone number, for example) can also be registered. This step can be part of the designation of the biological identifier as a VATI as described above. Alternatively, the step can occur at the time a simple player card is issued.

[b] To initiate a wager transaction, a player provides to the on-line terminal biometric sensor a player bid biometric sample collected from the player's person and as an option, player bid identification data, which are electronically forwarded to the online lottery server or host database.

[c] On the server or host, a comparator engine (e.g., transaction processor) compares the bid biometric sample with at least one previously registered biometric sample for producing either a successful or failed identification of the player.

[d] As an option, the comparator engine also references the player's bid identification data with a player's registered identification data for further producing either a successful or failed identification of the player or to improve the level of confidence in matching the biometric comparisons.

[e] Once the on-line database successfully identifies the player, the database system presents to the terminal the option to (1) select submission from the previously stored wager entry data or (2) automatically submit the previously stored wager data as a transaction to the host wagering system.

[f] The host wagering system processes the wager entry and issues at least one set of transaction confirmation data which is stored in the database as a record for the associated player.

[g] For validation of the winning data for a prize claim by a player, the player bid biometric sample is collected from the player's person and electronically forwarded to the online database. As an option, player bid identification data (e.g., as represented on the card) is also electronically forwarded to the online database.

[h] The comparator engine or transaction processor attempts to identify the player's biometric signature and, if successful, submits to the host any associated and previously stored transaction receipt data for the purpose of winning validation by the host wagering system.

It will be appreciated that, where appropriate, use of modern data encryption and digital signature techniques such as those used by the public/private key infrastructure (PKI) can be used throughout all the transaction paths to ensure complete end-to-end data integrity and security and protection of privacy. Further, the player's actual identity (such as name, age, or address) can remain completely anonymous to the system for the purposes of these applications. As an option, the player's age can be registered to the system to ensure age eligibility for wagering with online agents and self service gaming machines. Account based wagering, where the player has a financial account on the wagering system can also be tied to this method of play for payment transactions.

As an additional embodiment, the data from at least one player bid biometric sample collected by the terminal can be used as a seed to a random number generator on the wagering terminal or on the host for the purpose of generating a random selection of wagering entry data to the wagering system.

Customer Sessions

With regard to customer sessions, a further aspect of the present invention permits a player to associate purchased lottery tickets with his or her card during a customer session. In this process, the card holder's card is scanned at a reader terminal or otherwise identified by the system of the present invention, and then the card holder's desired ticket purchases are also scanned at a reader terminal or otherwise identified by the system of the present invention. The identified tickets are then associated with the player's card and therefore, the player's account. The tickets can be paid for via automatic deduction of the funds in the player's account as described above. Further, the player can be credited for having purchased the tickets for purposes of receiving benefits, points, rewards, eligibility for other jackpots, personalized GPS, winning when buying and related benefits as identified herein. Once the purchase activity is over, the customer session can then be terminated by the card holder or a POS operator where appropriate. Further, the player can then track his account and activity using the system of the present invention, and can optionally request that the system of the present invention generate a 1099 form for tax purposes at a designated time during the year. In another embodiment of this aspect of the present invention, the card holder can bring the tickets purchased in this manner to a lottery service provider terminal for instant validation. While the tickets in this embodiment can be played in the traditional physical sense (e.g., by the player scratching off areas of the ticket), the payment of winnings is handled electronically and without paper.

It will be apparent to one skilled in the art that any computer system that includes suitable programming means for operating in accordance with the disclosed methods also falls well within the scope of the present invention. Suitable programming means include any means for directing a computer system to execute the steps of the system and method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. Aspects of the present invention may be embodied in a computer program product, such as a diskette or other recording medium, for use with any suitable data processing system. The present invention can further run on a variety of platforms, including Microsoft Windows™, Linux™, Sun Solaris™, HP/UX™, IBM AIX™ and Java compliant platforms, for example.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A system, comprising:
a lottery data processing system for communicating a first funding amount to be applied to a multi-purpose transaction card based on winnings from a lottery offering and for converting the multi-purpose transaction card to a Value-applied transaction instrument without direct funding from an individual, wherein the multi-purpose transaction card initially has no cash value and cannot be used for debit, credit or stored value purchases until converted to the value-applied transaction instrument; and
a reader terminal for reading at least a portion of the transaction card such that one or more lottery tickets can be associated with the transaction card.

2. The system of claim 1 further comprising a communications link from the lottery data processing system to a financial institution data processing system, wherein the financial institution data processing system includes programming for initiating the opening of a financial account associated with the transaction card, wherein the financial institution account is funded with a balance in the amount of the first funding amount.

3. The system of claim 2 wherein the reader terminal is capable of reading at least a portion of the transaction card and communicating a transaction amount to the financial institution data processing system that changes the balance in the financial institution account.

4. The system of claim 1 wherein the reader terminal reads at least a portion of the transaction card in order to initiate a winning wager redemption process without paper or cash.

5. The system of claim 4 wherein the reader terminal conducts the winning wager redemption process by validating the winning wager through the lottery data processing system, whereupon the lottery data processing system communicates a winning wager amount to the financial institution data processing system so as to increase the balance in the financial institution account.

6. The system of claim 1 wherein the lottery data processing system includes a lottery host having a gaming processor associated therewith for generating a pool of benefits capable of being won by a user of the transaction card.

7. The system of claim 6 wherein the lottery host receives a communication from the reader terminal that a user of the transaction card has initiated a transaction at the reader terminal, whereupon the gaming processor generates a random index into the pool of benefits and retrieves a selected benefit that is awarded to the user of the transaction card.

8. The system of claim 7 wherein the selected benefit is in the form of a winning cash amount, and wherein the reader terminal automatically communicates the winning cash amount to the financial institution data processing system so as to increase a balance of a financial institution account associated with the transaction card.

9. The system of claim 1 wherein the lottery data processing system includes a lottery host having a gaming processor associated therewith for developing a virtual gaming ticket book that includes a guaranteed prize structure that guarantees a frequency of wins, wherein the lottery host associates the book with the transaction card.

10. The system of claim 1 wherein the lottery data processing system includes a lottery host having a gaming processor associated therewith for developing a virtual gaming ticket book that includes a guaranteed prize structure, wherein the lottery host associates the book with at least one reader terminal in communication with the lottery data processing system.

11. The system of claim 1 wherein the lottery data processing system includes a lottery host capable of managing multiple special-interest games not available for play by the general public, and further wherein the multi-purpose transaction card machine can associate the transaction card with at least one special-interest game such that the reading of at least a portion of the indicia indicates that the multi-purpose transaction card is capable of participating in one or more special-interest games.

12. The system of claim 3 wherein the transaction amount is not added to or subtracted from the account balance in its entirety.

13. The system of claim 3 wherein at least a portion of the transaction amount is applied to a gaming wager associated with the transaction card, wherein the gaming wager is not in connection with a game offered by the lottery data processing system to the general public.

14. The system of claim 1 wherein, upon the reader terminal reading at least a portion of the transaction card, the reader terminal prompts the holder of the transaction card for a contribution to a gaming wager not connected to a game offered by the lottery data processing system to the general public.

15. The system of claim 1 wherein, upon the reader terminal reading at least a portion of the transaction card, the reader terminal prompts a holder of the transaction card to decide whether to apply a rebate or cash-back offer towards a gaming wager for a special-interest game that is not available for play by the general public.

16. The system of claim 1 wherein, upon the reader terminal associating a wager with the transaction card, the reader terminal prompts the holder of the transaction card for a commitment to attribute at least a portion of any winnings from the initial wager with a gaming wager not connected to a game offered by the lottery data processing system to the general public.

17. The system of claim 1 wherein the reader terminal automatically communicates benefits associated with the one or more instant lottery tickets to the lottery data processing system for adding to a lottery account associated with the transaction card.

18. A method, comprising:
communicating, from a lottery data processing system, a first funding amount to be applied to a multi-purpose transaction card based on winnings from a lottery offering and converting the multi-purpose transaction card to a value-applied transaction instrument without direct funding from an individual, wherein the multi-purpose transaction card initially has no cash value and cannot be used for debit, credit or stored value purchases until converted to the value-applied transaction instrument; and
providing a reader terminal for reading at least a portion of the transaction card such that one or more lottery tickets can be associated with the transaction card.

19. The method of claim 18 including the step of providing a communications link from the lottery data processing system to a financial institution data processing system, wherein the financial institution data processing system includes programming for initiating the opening of a financial institution account associated with the winnings from a gaming event or transaction, wherein the financial institution account is funded with a balance in the amount of the first funding amount.

20. The method of claim 19 wherein the reader terminal is capable of reading at least a portion of the transaction card and communicating a transaction amount to the financial institution data processing system that changes the balance in the financial institution account.

21. The method of claim 18 wherein the reader terminal reads at least a portion of the transaction card in order to initiate a winning wager redemption process without paper or cash.

22. The method of claim 18 wherein the lottery data processing system includes a lottery host having a gaming processor associated therewith for generating a pool of benefits capable of being won by a user of the transaction card.

23. The method of claim 18 wherein the lottery host receives a communication from the reader terminal that a user of the multi-purpose transaction card has initiated a transaction at the reader terminal, whereupon the gaming processor generates a random index into the pool of benefits and retrieves a selected benefit that is awarded to the user of the transaction card.

24. The method of claim 18 wherein the lottery data processing system includes a lottery host having a gaming processor associated therewith for associating a virtual gaming ticket book with the transaction card, wherein the virtual gaming ticket book includes a guaranteed prize structure.

25. The method of claim 18 wherein the reader terminal is in communication with the lottery data processing system, wherein the lottery data processing system includes a lottery host having a gaming processor associated therewith for associating a virtual gaming ticket book with the reader terminal, and wherein the virtual gaming ticket book includes a guaranteed prize structure.

26. The method of claim 18 wherein the lottery data processing system includes a lottery host capable of managing multiple special-interest games not available for play by the general public, and further wherein the multi-purpose transaction card machine can associate the transaction card with at least one special-interest game such that the reading of at least a portion of the transaction card indicates that the transaction card is capable of participating in one or more special-interest games.

27. The method of claim 20 wherein the transaction amount is not added to or subtracted from the account balance in its entirety.

28. The method of claim 20 wherein at least a portion of the transaction amount is applied to a gaming wager associated with the transaction card, wherein the gaming wager is not in connection with a game offered by the lottery data processing system to the general public.

29. The method of claim 19 wherein, upon the reader terminal reading at least a portion of the transaction card, the reader terminal prompts the holder of the transaction card for a contribution to a gaming wager not connected to a game offered by the lottery data processing system to the general public.

30. The method of claim 18 wherein, upon the reader terminal reading at least a portion of the transaction card, the reader terminal prompts a holder of the transaction card to decide whether to apply a rebate or cash-back offer towards a gaming wager for a special-interest game that is not available for play by the general public.

31. The method of claim 18 wherein, upon the reader terminal associating a wager with the transaction card, the reader terminal prompts the holder of the transaction card for a commitment to attribute at least a portion of any winnings from the initial wager with a gaming wager not connected to a game offered by the lottery data processing system to the general public.

32. The method of claim 18 wherein, upon the reader terminal reading at least a portion of the transaction card, the reader terminal prompts a printer to print a wager receipt with the name of a customer associated with the transaction card.

33. A method for deriving non-transaction related earnings from a winning game play, comprising:
   issuing a request from a lottery data processing system to a financial institution data processing system to open an interest-bearing financial institution account associated with winnings from a lottery offering;
   communicating a first funding amount from the lottery data processing system to the financial institution data processing system based on the winnings in order to fund the account without direct funding from an individual, with the account having a balance initially in the amount of the first funding amount;
   providing a reader terminal for reading a multi-purpose transaction card capable of use by a consumer for lottery and non-lottery transactions that reduce or increase the balance; and
   applying interest earned on the account to a custodian earning account not associated with the consumer.

* * * * *